United States Patent
Bolden et al.

(10) Patent No.: US 8,265,235 B2
(45) Date of Patent: Sep. 11, 2012

(54) WIRELESS AND WIRELINE MESSAGING SERVICES

(75) Inventors: Evelyn L. Bolden, Johns Creek, GA (US); Compton Wharton, Duluth, GA (US); Rauf A. Qureshi, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 1144 days.

(21) Appl. No.: 12/062,434

(22) Filed: Apr. 3, 2008

(65) Prior Publication Data

US 2009/0041211 A1  Feb. 12, 2009

Related U.S. Application Data

(60) Provisional application No. 60/921,673, filed on Apr. 3, 2007.

(51) Int. Cl.
*H04M 1/64* (2006.01)

(52) U.S. Cl. ............ 379/88.12; 379/88.18; 379/88.25
(58) Field of Classification Search ........... 379/88.12, 379/88.18, 88.25
See application file for complete search history.

(56) References Cited

U.S. PATENT DOCUMENTS

| | | | |
|---|---|---|---|
| 7,532,710 B2 * | 5/2009 | Caputo et al. | 379/88.18 |
| 7,801,286 B1 * | 9/2010 | Thentheruperai et al. | 379/88.25 |
| 2006/0262911 A1 * | 11/2006 | Chin et al. | 379/88.18 |

* cited by examiner

*Primary Examiner* — Fan Tsang
*Assistant Examiner* — Van D Huynh
(74) *Attorney, Agent, or Firm* — Merchant & Gould

(57) ABSTRACT

Automatic access to a secondary or alternate voicemail box while operating or using a first or primary voicemail box is provided. One touch access to an alternate voicemail box from a wireless telephone device is further provided, and access to a given voicemail box from a number of trusted telephone devices is provided without requiring users of the trusted devices to authenticate into the voicemail box (e.g., provide a password).

14 Claims, 5 Drawing Sheets

WIRELESS AND WIRELINE MESSAGING SERVICES

RELATED APPLICATIONS

This Application claims benefit of U.S. Provisional Patent Application, Ser. No. 60/921,673, entitled "Wireless Messaging", filed with the U.S. Patent and Trademark Office on Apr. 3, 2007, which is incorporated herein by reference in its entirety.

BACKGROUND

With modern wireline and wireless telephone systems, it is common for a given user to have one or more wireline telephone voicemail boxes and one or more wireless voicemail boxes. For example, a user may have a home wireline voicemail box, an office wireline voicemail box, a personal wireless voicemail box and a business wireless voicemail box. Such a user may receive voicemail messages at each such voicemail box, and the user is required to check each voicemail box separately at periodic times to insure that messages left at each voicemail box are heard and/or handled as required. Checking the voicemail messages at multiple voicemail boxes by separately connecting to each voicemail box is tedious and time consuming. Thus, there is a need for providing a user access to multiple voicemail boxes via a single connection.

In addition, often a user desires to connect to a given voicemail box from a number of different wireline or wireless devices, but the user is required to pass through an authentication process (for example, entry of a password or other authentication identification) to allow access to the voicemail box from a wireline or wireless telephone device not otherwise associated with the desired voicemail box. For example, a user may desire to call his wireless voicemail box from the wireless or wireline telephone of a friend or relative. There is a need to allow automated access to a given voicemail box from one or more trusted telephone devices.

It is with respect to these and other considerations that the present invention has been made.

SUMMARY

The above and other problems are solved by providing automatic access to a secondary or alternate voicemail box while operating or using a first or primary voicemail box, by providing one touch access to an alternate voicemail box from a wireless telephone device, and by providing access to a given voicemail box from a number of trusted telephone devices without requiring users of the trusted devices to authenticate into the voicemail box (e.g., provide a password).

According to one embodiment, a single access method and system are provided which enables one touch access to an alternate mailbox while in another mailbox. For example, if a user operates a wireless telephone and a landline telephone, each being associated with a voicemail box, and a voice message is received at the wireless telephone voicemail box, when the user checks the received voice message, the user may be prompted to check messages on his/her landline voicemail box. If the user desires to check messages on the landline voicemail box, he/she may be automatically connected to the landline voicemail box from within the wireless telephone voicemail box, and the user may be returned to the wireless telephone voicemail box after checking messages at the landline voicemail box.

According to another embodiment, a cross retrieval method and system are provided which enables one touch access to an alternate voicemail box from a wireless telephone. A landline telephone may be configured to send text messages to a wireless telephone each time a new voice message is deposited in a voicemail box associated with the landline telephone. The text message includes a telephone number for accessing the landline telephone voicemail box, and at the wireless telephone, the telephone number for accessing the landline telephone voicemail box is highlighted as a soft key. Selection of the soft key allows automatic connection to the landline voicemail box from the wireless telephone. While connected to the landline telephone voicemail box, the user may conduct administrative actions on the landline voicemail box, including changes to greetings and the like.

According to another embodiment, a trusted list is provided that enables a voicemail box to be accessed by a number of trusted devices from which users may access the voicemail box for checking messages and for performing administrative actions on the voicemail box. Subscribers may configure a trusted list via a graphical user interface (GUI) interface that collects telephone number digits associated with trusted devices and sends the digits to an application server that interfaces a voicemail system associated with the subject voicemail box. When a user accesses the voicemail box from a device on the trusted list, the user is immediately connected to the voicemail box to check messages and to perform all administrative actions without the need to separately authenticate into the voicemail box (for example, by providing a password).

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
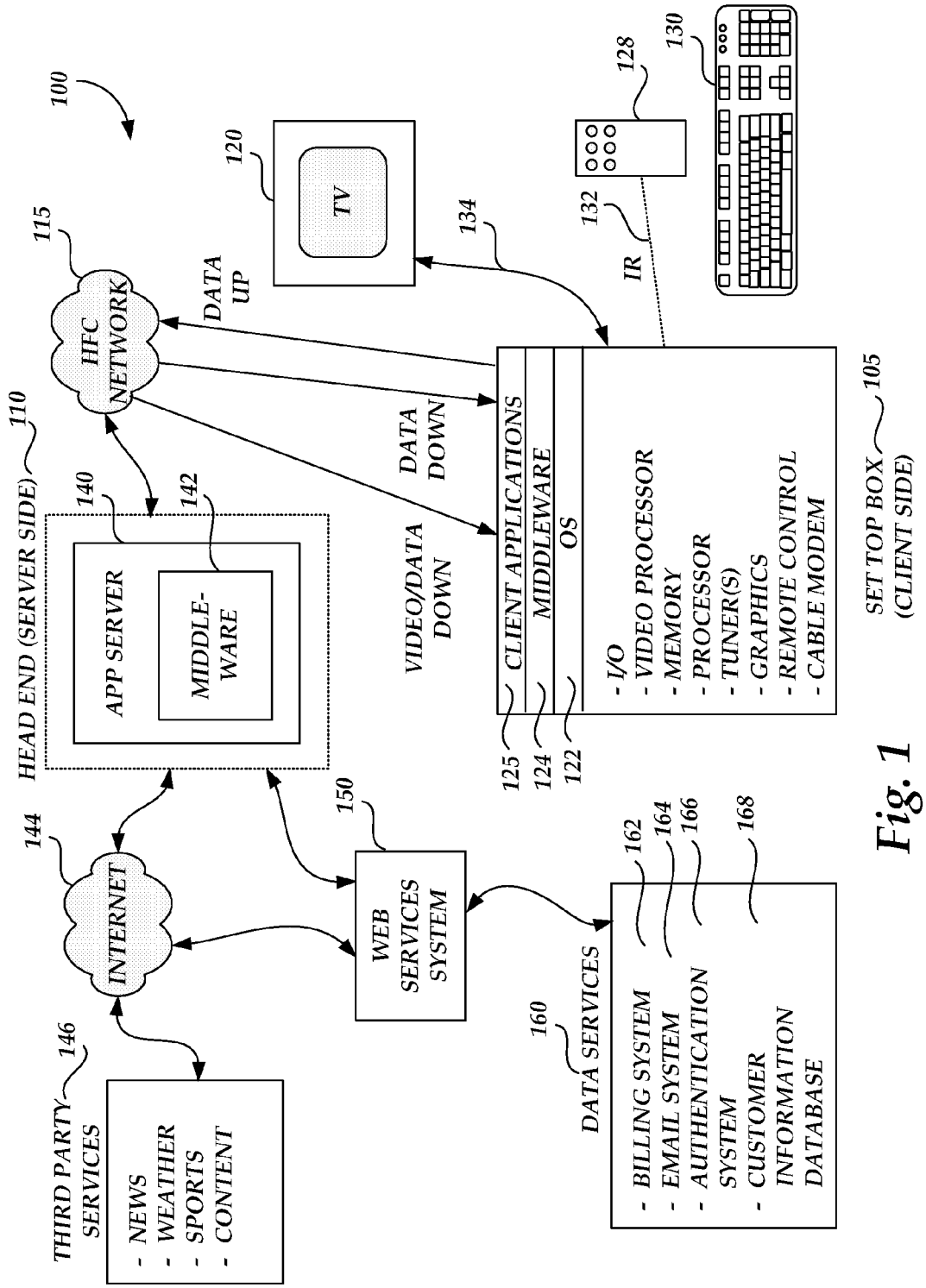
FIG. 1 is a simplified block diagram illustrating a cable services network architecture that may serve as an exemplary operating environment for embodiments of the present invention.

As briefly described above, embodiments of the present invention are directed to providing automatic access to a secondary or alternate voicemail box while operating or using a first or primary voicemail box, to providing one touch access to an alternate voicemail box from a wireless telephone device, and to providing access to a given voicemail box from a number of trusted telephone devices without requiring users of the trusted devices to authenticate into the voicemail box (e.g., provide a password). These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Operating Environment

As will be described herein, embodiments of the present invention are directed to interaction between wireless and wireline voicemail systems to allow users to access alternate wireless and wireline voicemail boxes from a single wireless or wireline telephone device without requiring the user to connect to each desired voicemail box separately. In addition, embodiments of the present invention are directed to allowing access to a prescribed voicemail box from one or more wireless or wireline telephone devices that are designated as trusted devices that may access the prescribed voicemail box without passing through an authentication procedure. Systems for providing both wireless and wireline telephone services and for providing voicemail services within wireless and wireline telephone services are well know to those skilled in the art. The following is a description of a cable television/services system that may provide one operating environment for a wireline telephone services system that may interact with one or more wireless telephone services systems according to embodiments of the present invention. As should be appreciated, other types of wireline telephone services systems may equally be used for interacting with one or more wireless telephone services systems as described below with respect to FIG. 2.

Embodiments of the present invention may be implemented in a number of distributed computing environments where functionality is tailored for provision of customer support services. According to an actual embodiment, the present invention is implemented in a cable television/services system. FIG. 1 is a simplified block diagram illustrating a cable television/services system 100 (hereafter referred to as "CATV") architecture that serves as an exemplary operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 126. For example, if a client application 125 requires a news flash from a third-party news source to be displayed on the television 120, the operating system 122 may cause the graphics functionality and video processor of the STB 105, for example, to output the news flash to the television 120 at the direction of the client application 126 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 126 and operating systems 122 that allow the client applications to communicate with the operating systems through common data calls understood via the AF'I set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Single Access

According to one embodiment, a single access method and system are provided which enables one touch access to an alternate mailbox while in another mailbox. For example, if a user operates a wireless telephone and a landline telephone, each being associated with a voicemail box, and a voice message is received at the wireless telephone voicemail box, when the user checks the received voice message, the user may be prompted to check messages on his/her landline voicemail box. If the user desires to check messages on the landline voicemail box, he/she may be automatically connected to the landline voicemail box from within the wireless telephone voicemail box, and the user may be returned to the wireless telephone voicemail box after checking messages at the landline voicemail box.

For purposes of example of the single access method and system described herein, consider that a user has two wireless telephones phones, WP1 and WP2, each with its own voicemail box and one landline telephone (LP) with its own voicemail box. Continuing with the example, WP1 and WP2 have the telephone number for LP as part of their subscriber database records. A caller calls WP1 and deposits a voice message. The user of WP1 receives a notification on WP1 of the received voice message. The user of WP1 dials into the voicemail box associated with WP1 to check the received message. After listening to the message, the user may be prompted to check messages on the voicemail box associated with LP. For example, a prompt may be provided such as "To check messages on LP voicemail, press 6." When the user presses 6 or takes other appropriately directed action, the voicemail system of WP1 may prompt the user that he/she is now retrieving messages for voicemail box number <LP's phone number>. The user is now in the LP voicemail box, and the user has full control over the voicemail box in the same manner as if the user had entered the LP voicemail box from the LP. That is, in addition to being able to check messages in the LP voicemail box, the user will have full administrative capabilities for the mailbox. If the user presses 6 again at the main menu or takes another appropriate action, the system will take the user back to the voicemail box of WP1, and an announcement may be provided to the user such as "Now retrieving messages for mailbox number <WP1's phone number>.

The fact that WP2 has the LP's phone number in its database means it has the same ability to retrieve messages as WP1 from the LP mailbox. There is no limit to the amount or type (wireless/wireline/softclient) of devices that can have the LP's phone number provisioned in their respective databases. The call flow looks at the dialed number identification service (DNIS) and the automatic number identification (ANI) for the incoming call to send the initial WP1 call into WP1 voicemail box. Once a mailbox is matched to the DNIS and ANI, the system will authenticate the user into the mailbox. Once in the mailbox, it will enable the prompting and functionality of the "single access" feature, described above if it sees a preprogrammed number for an alternate mailbox in the database. If there is no number for the feature in the database then it will not play the prompt, nor will it offer the functionality.

Figure 2:
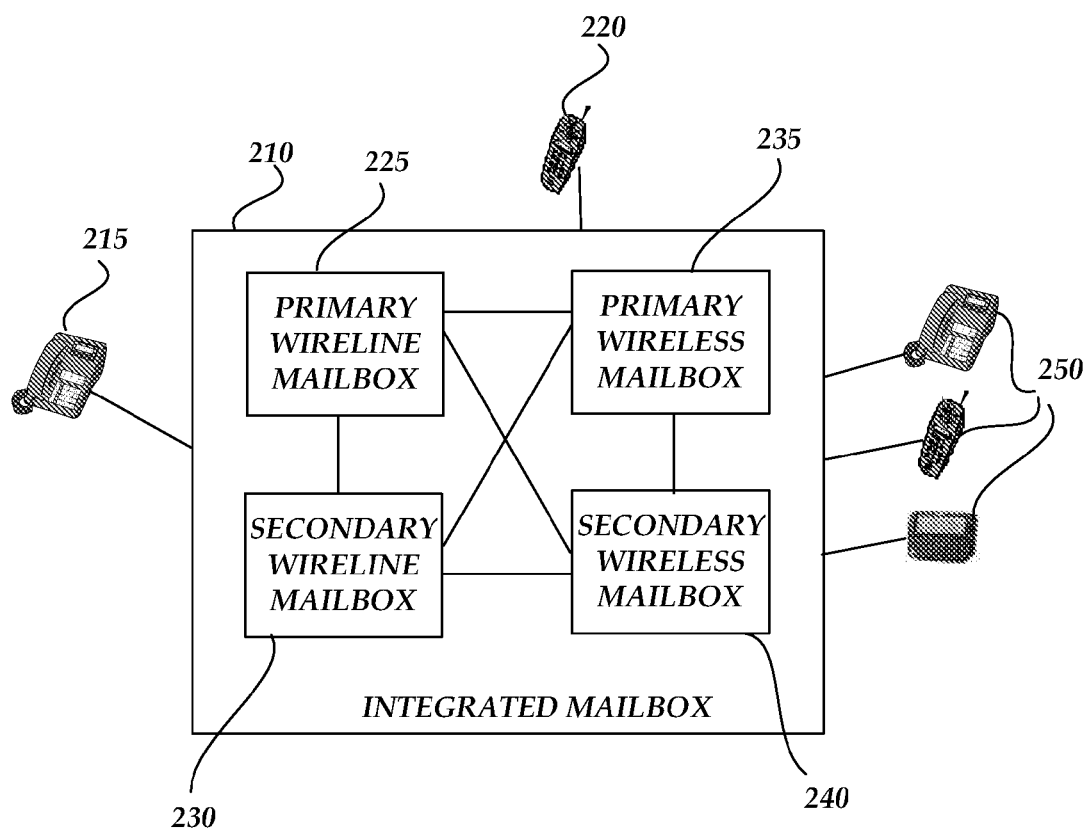
FIG. 2 is a simplified block diagram showing interaction between one or more wireline and/or wireless telephone devices with an integrated voicemail box according to embodiments of the present invention.

According to another embodiment the single access method and system are provided via an integrated or single access voicemail system through which a user may access one or more alternate voicemail boxes via a prescribed wireless or wireline voicemail system. FIG. 2 is a simplified block diagram showing interaction between one or more wireline and/or wireless telephone devices with an integrated voicemail box. Referring to FIG. 2, an integrated mailbox 210 is illustrated showing a primary wireline mailbox 225, a secondary wireline mailbox 230, a primary wireless mailbox 235, and a secondary wireless mailbox 240. As should be appreciated, each of the primary and secondary wireline and wireless mailboxes may be voicemail boxes associated with one or more wireline or wireless telephone users. For example, the primary wireline mailbox 225 may be associated with a user's home wireline telephone. The secondary wireline mailbox 230 may be associated with the user's office wireline voicemail box, the primary wireless mailbox 235 may be associated with the user's personal wireless voicemail box and the secondary wireless mailbox 240 may be associated with the user's business wireless mailbox. Each of the primary and secondary wireline and wireless voicemail boxes may be provided by a single telephone services provider that provides both wireline and wireless telecommunications services. Alternatively, each of the illustrated primary and secondary wireline and wireless voicemail boxes may be provided by a different wireline and wireless telecommunication services providers.

As described above, a given user may receive voicemail at each of the primary and secondary wireline and wireless voicemail boxes from wireline telephone devices 215 or wireless telephone devices 220. According to one embodiment, a user may access each of the primary and secondary wireline and wireless voicemail boxes via a single access connection through the user's wireless telephone device 220. Alternatively, the user may access each of the primary and secondary wireline and wireless voicemail boxes via a wireline telephone device 215. The user may associate one or more alternate (wireline or wireless) voicemail boxes with a prescribed telephone device so that the user may be automatically connected to the designated one or more alternate voicemail boxes from the prescribed device. For example, a user of the wireless device 220 having a primary wireless voicemail box 235 may designate the primary wireline mailbox 225, the secondary wireline mailbox 230 and the secondary wireless mailbox 240 as alternate voicemail boxes that may be accessed automatically from the voicemail system associated with the primary voicemail box 235 of the user's wireless device 220.

According to one embodiment, a graphical user interface may be provided to the user via the user's telephone device for allowing the user to enter the telephone numbers associated with the alternate voicemail boxes. When telephone numbers associated with alternate voicemail boxes are received, the telephone numbers may be stored in a subscriber database associated with the user for subsequent recall when the user desires access to a designated alternate voicemail box. According to one embodiment, an automatic number identification (ANI) or a dialed number identification service (DNIS) associated with the primary voicemail box of the user's telephone device 220 may be annotated with information associated with the one or more designated alternate voicemail boxes. For example, an additional digit (e.g. "2") may be applied to the telephone number associated with the primary voicemail box to indicate that one or more alternate voicemail boxes are associated with the primary wireless voicemail box.

According to an embodiment, when a user of a prescribed telephone device accesses his/her primary voicemail box 235, the alternate voicemail box identification appended to the telephone number associated with the primary wireless voicemail box causes a search for telephone directory numbers associated with alternate voicemail boxes designated by the user. When the user is checking voice messages left on the user's primary voicemail box, the user may then be prompted to check the one or more alternate voicemail boxes for voice messages left therein. If the user desires to check messages at the one or more alternate voicemail boxes, the user may be automatically connected to the desired one or more alternate voicemail boxes without terminating his/her connection to the primary voicemail box followed by re-connection to the desired alternate voicemail boxes. Thus, the user achieves single access connection to one or more voicemail boxes through one connection via the user's primary voicemail box. As should be appreciated, connection to one or more alternate voicemail boxes, as described herein, may be initiated through any wireless or wireline voicemail box where access to alternate voicemail boxes has been enabled as described herein, such as the primary or secondary wireless or wireline voicemail boxes, illustrated in FIG. 2.

Figure 3:
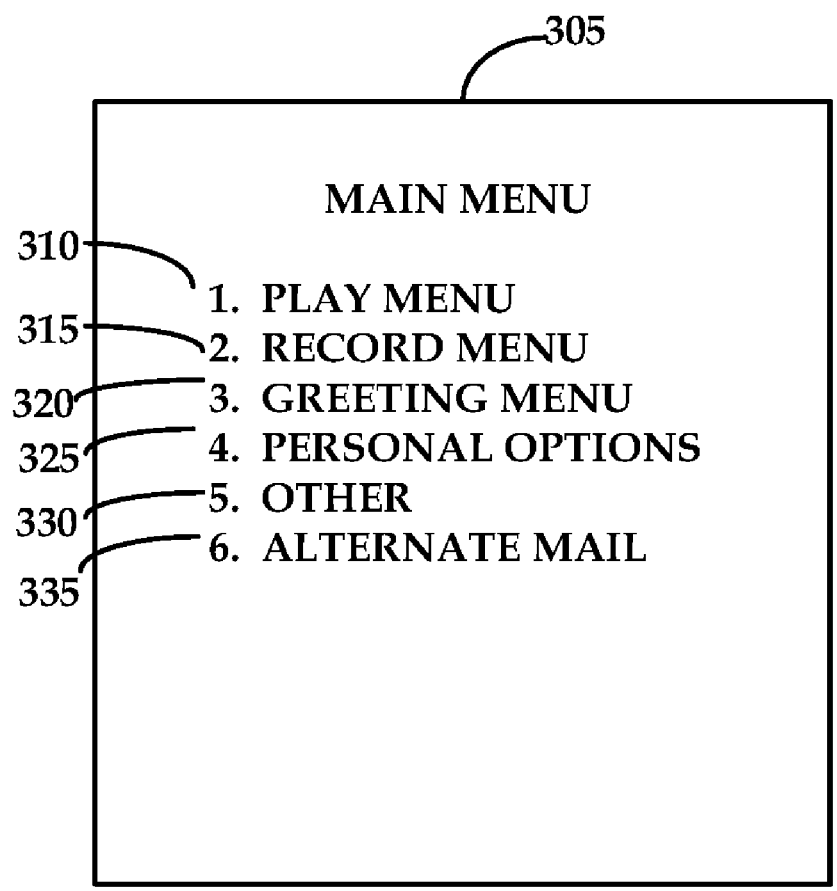
FIG. 3 is a simplified block diagram of a graphical user interface for allowing a user to select an alternate voicemail box for receiving voicemail messages from the alternate voicemail box.

FIG. 3 is a simplified block diagram of a graphical user interface for allowing a user to select an alternate voicemail box for receiving voicemail messages from the alternate voicemail box. The menu 305 is illustrative of a graphical user interface-type menu that may be provided on a wireline or wireless telephone device 215, 220 for obtaining services via the associated telephone device. As illustrated in the menu 305, and "alternate mailbox" button or control 335 is provided for allowing a user to access one or more alternate voicemail boxes associated with the wireline or wireless telephone device, as described above. That is, using a menu, such as illustrated in FIG. 3, a user may selectively obtain voice messages left at one or more designated alternate voicemail boxes by pressing an appropriate telephone device key or by uttering an appropriate voice command. A menu similar to the illustrated menu 305 also may be used for allowing a user to set up or designate those alternate voicemail boxes to which access will be enabled, as described herein.

Figure 4:
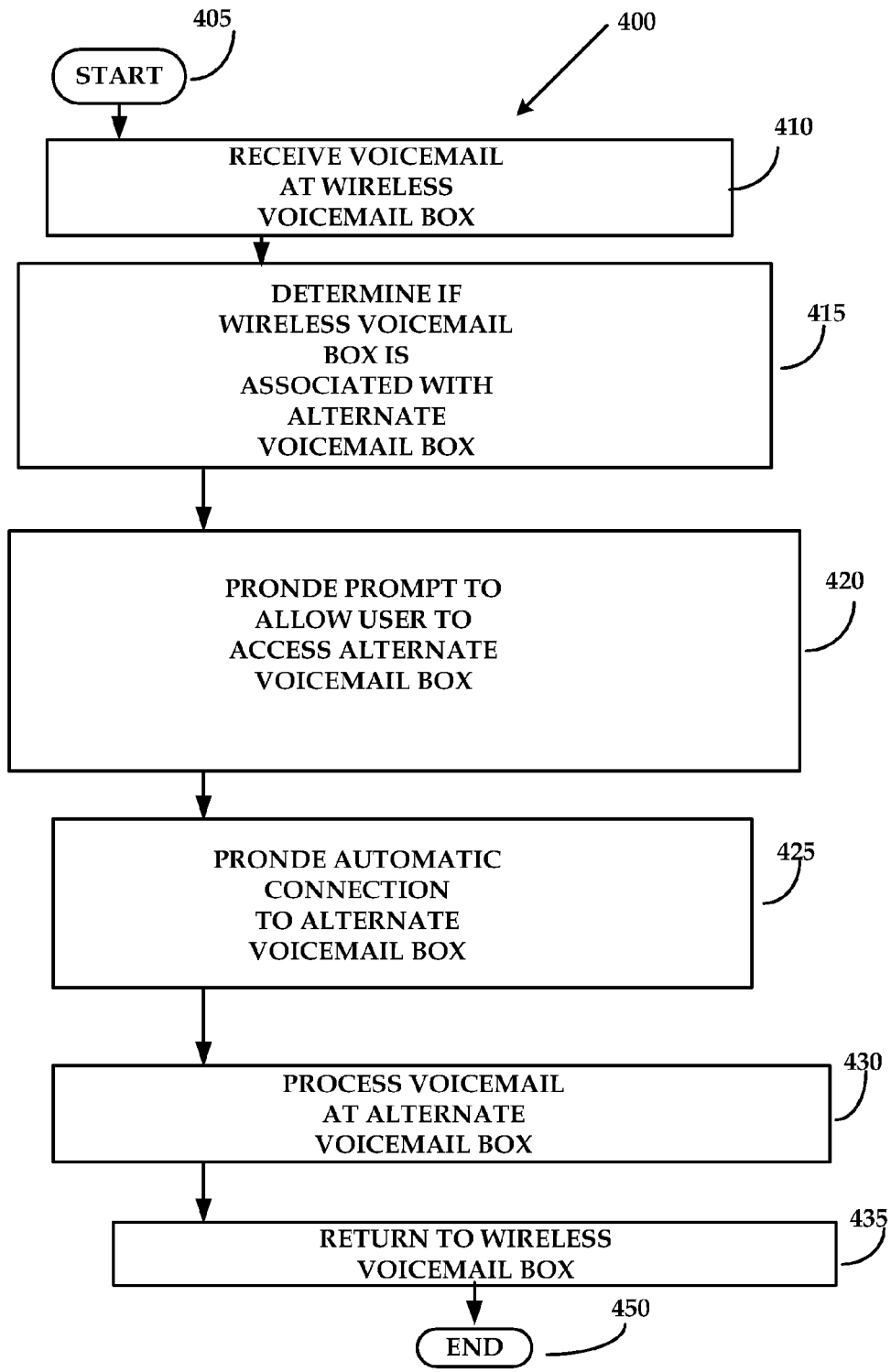
FIG. 4 is a logical flow diagram showing an illustrative routine for allowing access to one or more alternate voicemail boxes via a single voicemail box connection.

Having described an exemplary operating environment and system architecture for embodiments of the present invention above with respect to FIGS. 1, 2 and 3, FIG. 4 is a logical flow diagram showing an illustrative routine for allowing access to one or more alternate voicemail boxes via a single voicemail box connection. As described below, access may be obtained to multiple voicemail boxes from a primary mailbox, but according to another embodiment only a single alternate voicemail box accessed from the primary voicemail box. Referring then to FIG. 4, the routine 400 begins at start operation 405 and proceeds to operation 410 where a voicemail message is received at a voicemail box, for example at a wireless voicemail box of a wireless device 220. As described above with respect to FIG. 2, the voicemail box at which a voicemail message is received at operation 410 may be a primary or secondary wireless or wireline voicemail box, for example, associated with a user's personal, business, or other telephone device 215, 220.

At operation 415, a determination is made as to whether the voicemail box at which the voicemail message is received is associated with an alternate voicemail box. As described above with respect to FIG. 2, if the user of the subject voicemail box has designated one or more alternate voicemail boxes that may be automatically accessed from the user's wireless or wireline telephone device, an identification associated with the user's primary voicemail box will be annotated with information for identifying the one or more alternate voicemail boxes. For example, the ANI associated with the voicemail box at which the voicemail is received at operation 410 may be annotated with one or more additional digits to indicate that one or more alternate voicemail boxes has been associated with the primary voicemail box.

After the voicemail is received at the wireless voicemail box at operation 410, if the user selects to enter his/her primary voicemail box to receive voice messages, the telephone number associated with the user's primary voicemail box may be sent to the voicemail system associated with the user's primary voicemail box. As should be appreciated, the user may access the alternate voicemail box, as described herein, without receipt of a voice message at operation 410. That is, the user may obtain access to the alternate voicemail box(es) by simply accessing the primary voicemail box, followed by accessing an alternate voicemail box, as described herein.

At operation 415, at the voicemail system associated with the user's primary voicemail box, the telephone number associated with the user's primary voicemail box is parsed to determine whether information is added to the telephone number identifying whether one or more alternative voicemail boxes has been associated with the primary voicemail box. For example, if the voicemail received at operation 410 is received at the user's personal wireless telephone device 220 having a telephone number of "555-123-4567," an additional digit, for example, "2", may be added to the beginning of the telephone number string, or may be appended to the end of the telephone number string to indicate to the voicemail system that one or more alternate voicemail boxes has been associated with the primary voicemail box. As should be appreciated, the use of the word "primary" for this example is meant to indicate the voicemail box to which the initial voice message is received at operation 410 or from which a user initiates a connection to an alternate or secondary voicemail box.

When the telephone number associated with the primary voicemail box is received at the voicemail system, if no information identifying an alternate voicemail box is provided, the voicemail system will provide the user access to voice messages stored for the primary voicemail box only. On the other hand, if information identifying an alternate voicemail box is provide, as described above, the voicemail system associated with the primary voicemail box will search a database associated with the subscriber/user to determine which one or more alternate voicemail boxes are associated with the primary voicemail box.

At operation 420, a prompt may be provided by the voicemail system to the user to indicate to the user that, in addition to voice messages received at the user's primary voicemail box, the user may retrieve voice messages received at one or more alternate voicemail boxes. For example, a prompt such as "To retrieve voice messages from your home wireline voicemail box, press 6" may be provided. If multiple alternate voicemail boxes are associated with the primary voicemail box, the prompt may provide access to the multiple voicemail boxes. For example, a prompt may be provided such as "To retrieve voice messages from your home wireline voicemail box, press 6; to retrieve voice messages from your business wireline voicemail box, press 7; to retrieve voice messages from your office wireless voicemail box, press 8," and the like.

At operation 425, if the user decides to retrieve voice messages from an alternate voicemail box, the user may be automatically connected to the desired voicemail box for retrieving desired voice messages. At operation 430, the user may process voice messages left at the alternate voicemail box, and at operation 435, the user may return to the primary voicemail box from which the routine 400 began. According to one embodiment, the user may be provided a prompt during operation 430 such as "To return to your primary voicemail box, press 1." After the user returns to the primary voicemail box or otherwise terminates interaction with the primary or alternate voicemail boxes, the routine ends at operation 450.

Cross Retrieval

According to another embodiment, a cross retrieval method and system are provided which enables one touch access to an alternate voicemail box from a wireless telephone. A landline telephone may be configured to send text messages to a wireless telephone each time a new voice message is deposited in a voicemail box associated with the landline telephone. The text message includes a telephone number for accessing the landline telephone voicemail box, and at the wireless telephone, the telephone number for accessing the landline telephone voicemail box is highlighted as a soft key. Selection of the soft key allows automatic connection to the landline voicemail box from the wireless telephone. While connected to the landline telephone voicemail box, the user may conduct administrative actions on the landline voicemail box, including changes to greetings and the like.

For an example of cross retrieval, consider that a landline telephone (LP1) is configured to send text messages to a wireless telephone (WP1) every time a new message is deposited in the voicemail box of LP1. When a message is deposited into the voicemail box of LP1, a text notification is sent from LP1's voicemail box to the telephone device that is designated to receive the notification via configuration of the designated telephone device telephone number at LP1. Embedded in the text message sent to the designated device (e.g., WP1) are numbers that can be used to call the LP1 voicemail system back to retrieve the message. The embedded digits are highlighted as a soft key by the receiving handset (if available). When the user selects the soft key or takes another directed action, the receiving telephone device calls the voicemail system associated with LP1 to retrieve the message. The voicemail system sees the digit string (DNIS) and sends the call into a call flow. This call flow takes the ANI for the incoming call from the designated receiving telephone device and appends a digit (for example, a "2") to the front of the digit string. The digit+ANI string is sent to the subscriber database associated with LP1 for a mailbox match. The system matches this digit+ANI string with a pre-configured digit string on LP1's mailbox and authenticates the caller into LP1's mailbox. This automatic authentication gives the user access to voicemail messages on the LP1 mailbox and full administrative privileges to the mailbox.

Figure 5:
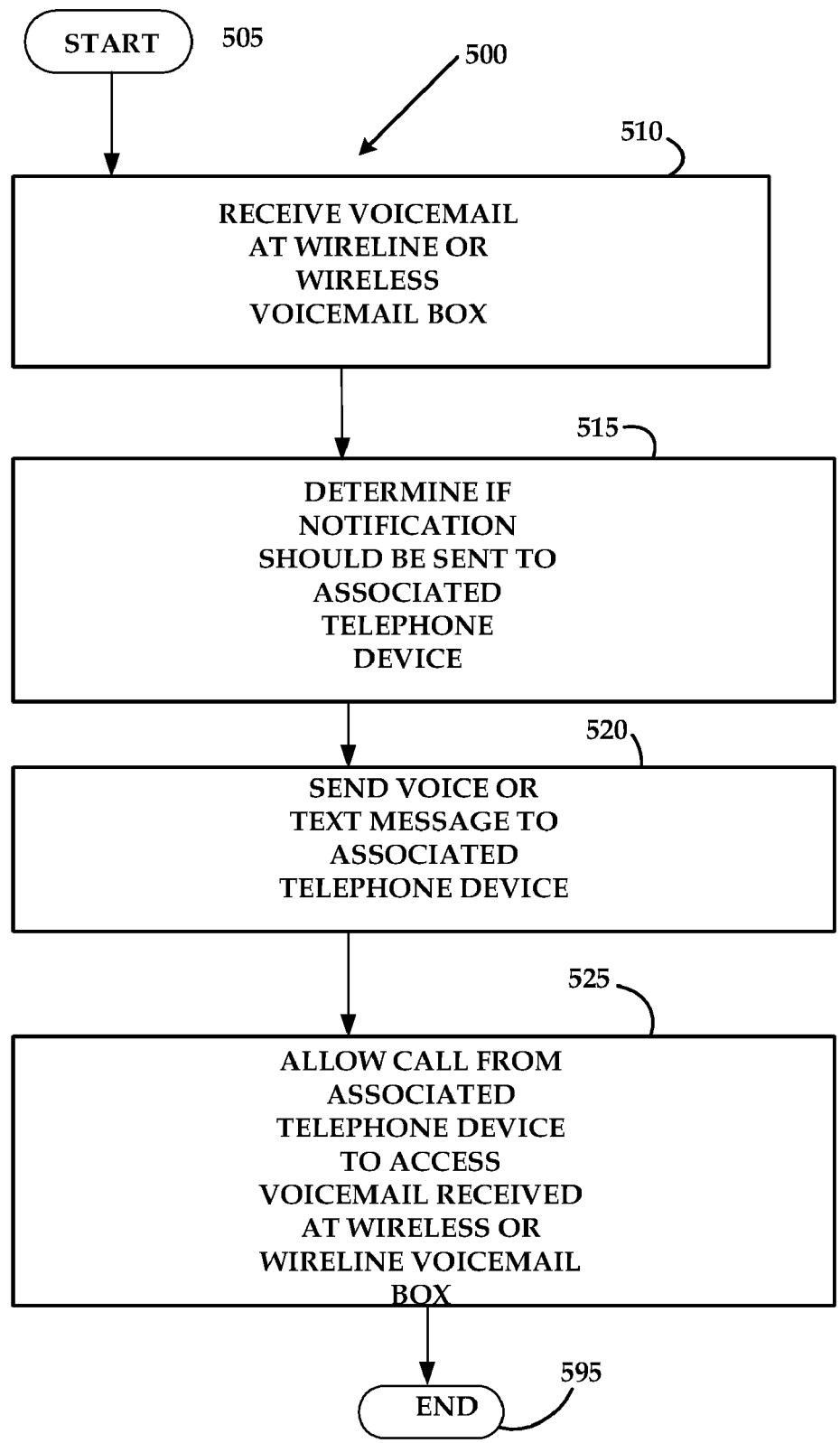
FIG. 5 is a flow diagram showing an illustrative routine for notifying a primary telephone device of a received voicemail message at an associated secondary telephone device.

According to another embodiment, a user of a primary telephone device 215, 220 may be notified of the receipt of a voice message at an alternate or secondary voicemail box associated with the user's primary voicemail box. That is, according to this embodiment, when a voice message is deposited at an alternate voicemail box associated with the user's primary voicemail box, as described above with respect to FIG. 4, a text or voice notification may be sent to the user at the user's primary telephone device 215, 220 to alert the user that a voice message has been deposited at the alternate voicemail box. FIG. 5 is a flow diagram showing an illustrative routine for notifying a primary telephone device of a received voicemail message at an associated secondary telephone device.

The routine 500, illustrated in FIG. 5, begins at start operation 505 and proceeds to operation 510 where a voicemail is received at a wireline or a wireless voicemail box that has been designated as an alternate voicemail box to the user's primary telephone device 215, 220, as described above with reference to FIG. 4. At operation 515, a determination is made as to whether a notification should be sent to the associated primary telephone device 215, 220. As described above with reference to FIG. 4, the telephone number associated with the alternate voicemail box at which the voicemail is received may be annotated with information to indicate that the receiving voicemail box is associated with another voicemail box, for example the voicemail box associated with the user's wireless telephone device 220. As described above with reference to FIG. 4, an additional digit or digits may be added to the telephone number associated with the receiving telephone device such that when the voice message is received at operation 510, the voicemail system associated with the receiving telephone device may be programmed to parse the telephone number to determine if additional information is present indicating that a notification should be sent to a different telephone device, for example, the user's wireless telephone device 220, to notify the user that a voice message has been deposited in the alternate voicemail box.

At operation 520, if a notification to the user is prescribed, a voice or text message may be sent to the associated wireless or wireline device 215, 220 to notify the user that a voice message has been deposited in one of the one or more alternate voicemail boxes. For example, if the user has designated her home wireline voicemail box as an alternate voicemail box to her personal wireless telephone device 220, then upon receipt of a voice message at her home wireline voicemail box, a text message may be sent to the user at her wireless telephone device 220 indicating that a voice message has been deposited at her home wireline voicemail box. Alternatively, a canned voice message may be sent to the user at her wireline or wireless device 215, 220 that may be played to the user, for example, "You have received a voice message at your home telephone voicemail" to indicate to the user the receipt of the voice message.

At operation 525, the user may be provided a prompt to allow the user to automatically connect to the receiving voicemail box to allow the user to retrieve the deposited voice message. For example, a text message may be provided to the user such as "You have received a voice message at your home wireline voicemail box . . . . To retrieve the voice message, press 5." If the user decides to retrieve the voice message, the user may be automatically connected to the receiving voicemail box from her wireline or wireless telephone devices 215, 220 for retrieving the voice message. If the user decides not to retrieve the deposited voice message at the present time, the user may retrieve the voice message at another time as described above with reference to FIG. 4. The routine 500 ends at operation 595.

Trusted List

According to another embodiment, a trusted list is provided that enables a voicemail box to be accessed by a number of trusted devices (for example, up to 15 devices) from which users may access the voicemail box for checking messages and for performing administrative actions on the voicemail box. Subscribers may configure a trusted list via a graphical user interface (GUI) into their subscriber account. This GUI collects digits associated with trusted devices that may access the subscriber's voicemail box and sends the digits to an application server that interfaces the voicemail system. The application server adds the collected digits to the subscriber's voicemail database record. These digits will be used to authenticate a call based on ANI into the voicemail box that in which it is stored. As an example, consider that landline telephone (LP1) has the telephone numbers for a first wireless telephone (WP1) and a second wireless telephone (WP2) added to database record for LP1. WP1 calls LP1 and no one answers. The call rolls to the voicemail box for LP1, and a greeting starts to play. While the greeting is playing, the caller presses a key designated for entering voicemail for the called telephone number. When the designated key is pressed, the system does a lookup on the "trusted" list of telephone numbers for the dialed number and sees that the ANI for WP1 is on the list. The voicemail system for LP1 immediately launches the caller into the voicemail box for LP1 without requiring additional authentication from the caller (e.g., entry of a password). The caller may then check messages on the LP1 voicemail box and conduct normal administrative actions on the LP1 voicemail box, such as changes to greetings and the like.

According to another embodiment, one or more wireless or wireline telephone devices 215, 220, 250, may be designated by a user as "trusted" devices that may be used to access one or more wireless or wireline voicemail boxes without requiring authentication of the user seeking access to the one or more voicemail boxes. According to this embodiment, a user may be provided a graphical user interface at his or her wireless or wireline telephone device 215, 220, 250 through which the user may enter the telephone numbers of one or more telephone devices that may be used to access a given voicemail box without authentication. For example, a user may desire automatic access to a voicemail box associated with his/her wireless telephone device 220 from his/her business wireline telephone device 215, his/her spouse's wireless telephone device, his/her child's wireless or wireline telephone device and the like.

According to this embodiment, the telephone numbers associated with each device to be designated as a trusted device may be entered and stored in a subscriber database associated with the user's voicemail system and associated with the voicemail box on the user's voicemail system to which the trusted devices will have access. According to one embodiment, the telephone numbers associated with the trusted devices may be annotated with information identifying the devices as having automatic access to a particular voicemail box without requiring authentication from a user of a given trusted device. Thus, if a call is received to a designated voicemail box from one of the one or more trusted devices, the calling party may be granted automatic access to the designated voicemail box without being required to provide a password or other authenticating information. For example, if a user has designated his/her business wireline telephone device as a trusted device for access to his/her personal wireless telephone device, then when the user dials a voicemail box associated with his/her personal wireless telephone device from his/her business wireline device, the user will be granted automatic access to the desired voicemail box without being required to provide a password or other authenticating information. According to an embodiment, once a user has access to a given voicemail box from a trusted device, the user may perform all applicable operations to the called voicemail box, including voicemail box maintenance actions, such as changes to greetings, and the like.

As described herein, methods and systems provide automatic access to one or more wireline or wireless voicemail boxes via a voicemail processing system of a starting telephone device without requiring separate connection to the one or more alternate voicemail boxes. In addition, one or more "trusted" wireline or wireless telephone devices may be designated for accessing a prescribed voicemail box so that when a call is received at the prescribed voicemail box from one of the one or more trusted devices, access to the prescribed voicemail box may be granted to the calling party without requiring authentication from the calling party. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of providing automatic access to a secondary voice mailbox via a primary voicemail box, comprising:
    providing a primary voicemail box for a primary telephone device of a user;
    providing a secondary voicemail box for a secondary telephone device of the user;
    receiving an instruction from the user of the primary telephone device to associate the secondary voicemail box with the primary voicemail box;
    receiving an indication of access to the primary voicemail box by the user;
    providing a prompt to indicate that the primary voicemail box is associated with the secondary voicemail box;
    receiving an indication to access the secondary voicemail box via the primary voicemail box; and
    upon receipt of the indication to access the secondary voicemail box via the primary voicemail box, providing automatic access to the secondary voicemail box via the primary voicemail box to allow retrieval of any voice messages stored at the secondary voicemail box.

2. The method of claim 1, wherein associating the secondary voicemail box with the primary voicemail box includes storing information in a subscriber database indicating an association of the secondary voicemail box with the primary voicemail box.

3. The method of claim 2, further comprising:
    providing an automatic number identification (ANI) for the primary voicemail box; and
    annotating the automatic number identification with information identifying the secondary voicemail box as being associated with the primary voicemail box.

4. The method of claim 1, prior to receiving an indication of access to the primary voicemail box, receiving a voice message at the primary voicemail box.

5. The method of claim 1, prior to providing a prompt to indicate that the primary voicemail box is associated with the secondary voicemail box, receiving an identification of the primary voicemail box at a voicemail system associated with the primary voicemail box.

6. The method of claim 1, wherein providing automatic access to the secondary voice mailbox includes automatically placing a call to the secondary voicemail box via the primary voicemail box to allow retrieval of any voice messages stored in the secondary voicemail box.

7. The method of claim 1, prior to providing automatic access to the secondary voicemail box, providing an indication that a voicemail message is waiting at the secondary voicemail box.

8. The method of claim 1, wherein providing the prompt to the user of the primary voicemail box includes providing one or more actions required for automatically accessing the secondary voice mailbox.

9. The method of claim 1, after providing automatic access to the secondary voicemail box via the primary voicemail box, returning to the primary voicemail box.

10. A method of notifying a primary telephone device of a voice message received at a secondary telephone device voicemail box, comprising:
    providing a primary voicemail box for a primary telephone device of a user;
    providing a secondary voicemail box for a secondary telephone device of the user;

receiving an instruction from the user of the primary telephone device to associate the secondary voicemail box with the primary telephone device;

receiving and storing a voice message at the secondary voicemail box;

determining whether a notification should be sent to the primary telephone device when the voice message is received at the secondary voicemail box associated with the secondary telephone device; and sending a notification from the secondary telephone device to the primary telephone device that a voice message has been received at the secondary voicemail box.

11. The method of claim 10, further comprising allowing automatic access to the secondary voicemail box from the primary telephone device for allowing retrieval of the voice message received at the secondary voicemail box via the primary telephone device.

12. The method of claim 11, wherein allowing automatic access to the secondary voicemail box from the primary telephone device includes placing a call from the primary telephone device to the secondary voicemail box.

13. The method of claim 10, wherein associating the secondary voicemail box with the primary telephone device includes storing information in a subscriber database associated with the secondary voicemail box indicating that a notification should be sent to the primary telephone device when a voice message is deposited in the secondary voicemail box.

14. The method of claim 10, wherein determining whether a notification should be sent to the primary telephone device includes parsing a subscriber database associated with the secondary voicemail box to determine whether information is stored indicating that a notification should be sent to the primary telephone device.

* * * * *